(12) United States Patent
Yang et al.

(10) Patent No.: US 9,102,333 B2
(45) Date of Patent: Aug. 11, 2015

(54) ENHANCED CROSSWIND ESTIMATION

(71) Applicant: FORD GLOBAL TECHNOLOGIES, LLC, Dearborn, MI (US)

(72) Inventors: Hsin-Hsiang Yang, Ann Arbor, MI (US); Kwaku O. Prakah-Asante, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/916,650

(22) Filed: Jun. 13, 2013

(65) Prior Publication Data

US 2014/0371948 A1 Dec. 18, 2014

(51) Int. Cl.
*B60W 40/02* (2006.01)
*B60W 50/00* (2006.01)

(52) U.S. Cl.
CPC .................. *B60W 50/0098* (2013.01)

(58) Field of Classification Search
CPC ............ B62D 6/00; B62D 6/003; B62D 6/04
See application file for complete search history.

(56) References Cited

U.S. PATENT DOCUMENTS

| | | | | |
|---|---|---|---|---|
| 5,508,929 A | * | 4/1996 | Harada | 701/48 |
| 5,555,495 A | * | 9/1996 | Bell et al. | 700/38 |
| 5,925,083 A | * | 7/1999 | Ackermann | 701/41 |
| 6,523,911 B1 | * | 2/2003 | Rupp et al. | 303/7 |
| 7,487,021 B2 | | 2/2009 | Shin et al. | |
| 7,516,965 B2 | | 4/2009 | Horiuchi | |
| 7,536,246 B2 | * | 5/2009 | Cho | 701/41 |
| 8,258,934 B2 | | 9/2012 | Filev et al. | |
| 8,504,243 B2 | | 8/2013 | Kageyama | |
| 2005/0267666 A1 | * | 12/2005 | Suzumura et al. | 701/70 |
| 2006/0220912 A1 | | 10/2006 | Heenan et al. | |
| 2006/0249326 A1 | * | 11/2006 | Birsching et al. | 180/422 |
| 2008/0015754 A1 | * | 1/2008 | Hac | 701/48 |
| 2008/0147276 A1 | * | 6/2008 | Pattok et al. | 701/42 |
| 2012/0197496 A1 | * | 8/2012 | Limpibunterng et al. | 701/42 |
| 2014/0041958 A1 | * | 2/2014 | Iijima et al. | 180/446 |

OTHER PUBLICATIONS

Yang, Hsin-Hsiang, Driver Models to Emulate Human Anomalous Behaviors Leading to Vehicle Lateral and Longitudinal Accidents, A dissertation submitted in partial fulfillment of the requirements for the degree of Doctor of Philosophy (Mechanical Engineering) in the University of Michigan 2010 (153 pages).

(Continued)

*Primary Examiner* — Jonathan M Dager
(74) *Attorney, Agent, or Firm* — Jennifer M. Stec; Brooks Kushman P.C.

(57) ABSTRACT

A device may identify a first forgetting factor accounting for a rate of change of vehicle uncertainty and a second forgetting factor accounting for a rate of change of crosswind estimation. The device may utilize a recursive-least-squares heuristic executed by a crosswind and vehicle uncertainty estimator and specialized with the first and second forgetting factors to determine vehicle uncertainty and crosswind estimation from driver steering inputs and crosswind disturbance inputs, the first and second forgetting factors accounting for relatively slower-changing vehicle uncertainty and relatively faster-changing crosswinds.

21 Claims, 6 Drawing Sheets

(56) References Cited

OTHER PUBLICATIONS

MacAdam et al., Crosswind Sensitivity of Passenger Cars and the Influence of Chassis and Aerodynamic Properties on Driver Preferences, CC. Vehicle System Dynamics, 19 (1990). Pp. 201-236 (36 pages).

Non-Final Office Action dated Jan. 8, 2015 for U.S. Appl. No. 13/957,792.

* cited by examiner

ENHANCED CROSSWIND ESTIMATION

BACKGROUND

Headwinds may be defined as winds that blow parallel to and against a direction of travel, while tailwinds may be defined as winds that blow parallel to and with the direction of travel. Crosswinds may be defined as winds that blow in a direction other than parallel to the direction of travel, and therefore include a perpendicular component compared to the direction of travel. Headwinds or tailwinds may be corrected for by a driver by way of throttle or brake input. However, correction for crosswind conditions may be more complicated, and may require the driver to provide steering inputs in addition to other driver corrections to preserve a desired vehicle heading and speed. Crosswind situations may therefore be uncomfortable for the driver, and may impose increased demand and workload on the primary vehicle control task.

SUMMARY

A method may include identifying a first forgetting factor accounting for rate of change of vehicle uncertainty and a second forgetting factor accounting for rate of change of crosswind estimation; and utilizing a recursive-least-squares heuristic executed by a crosswind and vehicle uncertainty estimator specialized with the forgetting factors to determine vehicle uncertainty and crosswind estimation from driver steering and crosswind disturbance inputs, the forgetting factors accounting for relatively slower-changing vehicle uncertainty and relatively faster-changing crosswinds.

A computing device may store a crosswind and vehicle uncertainty estimator application executable by a processor of the computing device to provide operations including identifying a first forgetting factor accounting for a rate of change of vehicle uncertainty and a second forgetting factor accounting for a rate of change of crosswind estimation; and utilizing a recursive-least-squares heuristic specialized with the first and second forgetting factors to determine vehicle uncertainty and crosswind estimation from driver steering inputs and crosswind disturbance inputs, the first and second forgetting factors accounting for relatively slower-changing vehicle uncertainty and relatively faster-changing crosswinds.

A non-transitory computer readable medium storing a crosswind and vehicle uncertainty estimator application software program, the crosswind and vehicle uncertainty estimator application being executable to provide operations including identifying a first forgetting factor accounting for a rate of change of vehicle uncertainty and a second forgetting factor accounting for a rate of change of crosswind estimation; and utilizing a recursive-least-squares heuristic specialized with the first and second forgetting factors to determine vehicle uncertainty and crosswind estimation from driver steering inputs and crosswind disturbance inputs, the first and second forgetting factors accounting for relatively slower-changing vehicle uncertainty and relatively faster-changing crosswinds.

DETAILED DESCRIPTION

The impact of crosswinds while driving may be estimated by computing a discrepancy between a driver-intended vehicle motion and actual vehicle motion. However, vehicle uncertainty contributes to this discrepancy and may contaminate the estimation. A recursive-least-squares method with multiple forgetting factors for estimating vehicle uncertainty and crosswind disturbance simultaneously may be utilized to provide for improved estimation of fast-changing crosswinds. The improved estimation of crosswind may provide increased sensitivity to mild crosswind estimation using basic vehicle sensors, and with a minimum of memory storage.

Based on the improved estimation of crosswind by addressing the vehicle uncertainty, during identified crosswind occurrences the system may be configured to perform one or more actions to address a determined condition. As one example, the system may be configured to provide real-time high attention caution reminders to elevate the driver's attention in crosswind situations exceeding a predetermined threshold amount. As another example, the system may be configured to incorporate estimated crosswind into decision-making for managing telematics unit communications to a driver, in order to regulate vehicle in-cabin telematics communications to the driver during periods of crosswind disturbance to avoid overloading the driver. As yet another example, the system may be configured to automatically send communications about the location and time of experienced crosswind to networked mobile systems or a central receiver. Such information may be relayed to drivers of vehicles within the network to inform them of possible crosswind conditions ahead.

Figure 1:
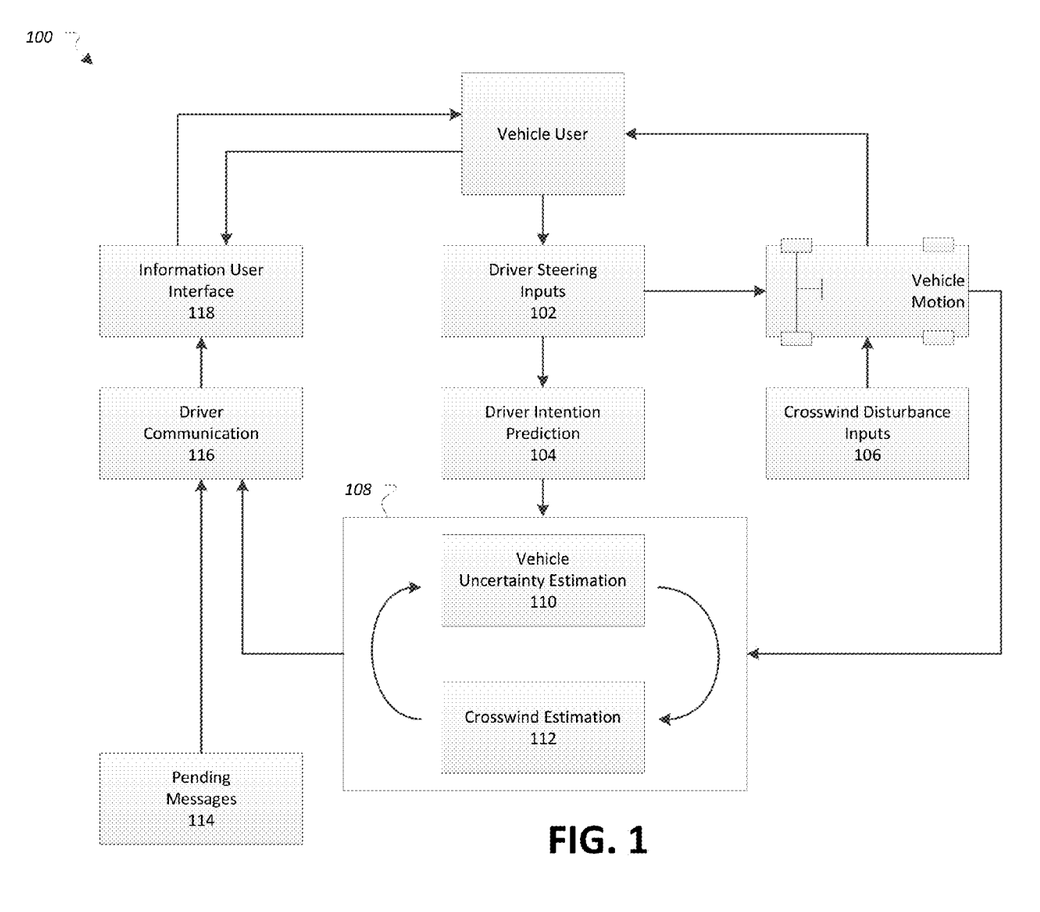
FIG. 1 illustrates an exemplary block system diagram for enhanced crosswind estimation.

FIG. 1 illustrates an exemplary vehicle system 100 for enhanced cross-wind estimation. The vehicle system 100 may receive driver steering inputs 102 such as from steering-angle sensors, which may be used to predict driver intention 104, and may also receive crosswind disturbance inputs 106 such as from vehicle yaw rate sensors and/or wheel-speed sensors, which may be used to determine actual vehicle movement. As explained in detail below, based on these inputs, a crosswind and vehicle uncertainty estimator 108 of the vehicle system 100 may perform an estimation of vehicle uncertainty 110 and crosswind estimation 112 using a recursive-least-squares method with multiple forgetting factors to provide for improved estimation of relatively fast-changing crosswinds in relation to driver inputs. Based on the crosswind estimation 112 determined by the crosswind and vehicle uncertainty estimator 108, the vehicle system 100 may be configured to selectively deliver pending messages 114 to the driver or otherwise provide driver communications 116 to the driver interface 118 accounting for increased workload to the driver based on the crosswind estimation 112.

The crosswind and vehicle uncertainty estimator 108 may be implemented as one or more computing devices (e.g., vehicle system 100 controllers), where the computing devices may include software stored in memory that may be executed by processors to provide the operations of the crosswind and vehicle uncertainty estimator 108 described herein. Alternatively, the crosswind and vehicle uncertainty estimator 108 and its components may be provided as hardware or firmware, or combinations of software, hardware and/or firmware.

More specifically, with respect to the improved crosswind estimation, the crosswind and vehicle uncertainty estimator 108 may utilize a mathematical model for vehicle lateral dynamics. This model may be represented as follows:

$$m \cdot x_{mea} = F_{y,steer} + F_{y,crosswind}, F_{y,steer} = f(\delta)$$

$$\Rightarrow x_{mea} = x_{steer} + x_{crosswind} \quad (1)$$

where $x_{steer}$ is the driver intended vehicle motion due to steering; $F_{y,crosswind}$ is the crosswind disturbance force; m is the vehicle inertia; $x_{mea}$ is measured vehicle motion; and $x_{crosswind}$ is vehicle motion induced by crosswind. The $x_{steer}$ driver intended vehicle motion may be determined based on the driver steering inputs 102, while the $x_{mea}$ measured vehicle motion may be measured based on vehicle sensors.

The crosswind and vehicle uncertainty estimator 108 may be configured to estimate the crosswind disturbance by comparing the vehicle motion intended by the driver with the motion as measured by sensors of the vehicle. However, the vehicle is neither linear in motion nor time-invariant. Thus, actual vehicle dynamics may be modeled by the crosswind and vehicle uncertainty estimator 108 as:

$$s_{mea} = \sigma(x_{steer}, x_{mea}) \cdot x_{steer} + x_{crosswind} \quad (2)$$

where $\sigma(x_{steer}, x_{mea})$ represents the model uncertainty 110 of the vehicle. This uncertainty 110 may degrade the crosswind estimation 112, especially when the crosswind estimation 112 is relatively small.

The crosswind and vehicle uncertainty estimator 108 may utilize a recursive-least-squares (RLS) method to estimate values of parameters of a system that vary over time. More specifically, the crosswind and vehicle uncertainty estimator 108 may utilize the RLS method to estimate values for vehicle uncertainty 110 and crosswind 112 together, such that the crosswind estimation 112 sensitivity may be improved. In the RLS method, more weight may be given to recent data and less weight to older data, thereby allowing older data to be forgotten or removed from consideration over time. Using the RLS method, the crosswind and vehicle uncertainty estimator 108 may approximate the model uncertainty of the vehicle $\sigma(x_{steer}, x_{mea})$ as an autoregressive-moving-average (ARMA) model as follows:

$$\sigma(x_{steer}, x_{mea}) \cong b_n \cdot x_{steer}(n) \cdot a_m \cdot x_{mea}(m) \quad (3)$$

Therefore, equation (2) becomes:

$$x_{mea}(k) = b_n \cdot x_{steer}(n) - a_m \cdot x_{mea}(m) \cdot x_{steer} + x_{crosswind}(k) \quad (4)$$

where n=k, k−1, . . . and m=k−1, k−2, . . . Equation (4) may further be rewritten in linear parametric form as follows:

$$Y = \phi^T \cdot \theta, \phi = [x_{steer}, x_{mea}, 1]^T, \theta = [a_n, b_m, x_{crosswind}]^T \quad (5)$$

Rather than merely using an RLS approach to estimate vehicle dynamic parameters, the crosswind and vehicle uncertainty estimator 108 may utilize an improved crosswind estimation approach with multiple RLS forgetting factors to account for relatively slower-changing vehicle uncertainty, and relatively faster-changing crosswind. Therefore, the recursive solution becomes:

$$\begin{bmatrix} \hat{\theta}_1(k) \\ \hat{\theta}_2(k) \end{bmatrix} = \begin{bmatrix} I & L_1(k)\phi_2(k) \\ L_2(k)\phi_1(k) & 1 \end{bmatrix}^{-1} \cdot \quad (6)$$

$$\begin{bmatrix} \hat{\theta}_1(k-1) + L_1(k)(y(k) - \phi_1(k) \cdot \hat{\theta}_1(k-1)) \\ \hat{\theta}_2(k-1) + L_2(k)(y(k) - \phi_2(k) \cdot \hat{\theta}_2(k-1)) \end{bmatrix}$$

where $L_1$ is the update gain with slower forgetting factor $\lambda_1$ to account for vehicle uncertainty estimation 110; $L_2$ is the update gain with faster forgetting factor $\lambda_2$, which accounts for crosswind estimation 112; and I is an m+n by m+n identity matrix. The forgetting factors $\lambda_1$ and $\lambda_2$ may be chosen from the range (0<$\lambda$≤1), and may each represent a weighting that reduces the influence of older data. Moreover, different forgetting factors $\lambda_1$ and $\lambda_2$ may be used for vehicle uncertainty 110 as compared to crosswind estimation 112, to allow the RLS method to more accurately track these parameters that vary according to different variation rates.

Figure 2A:
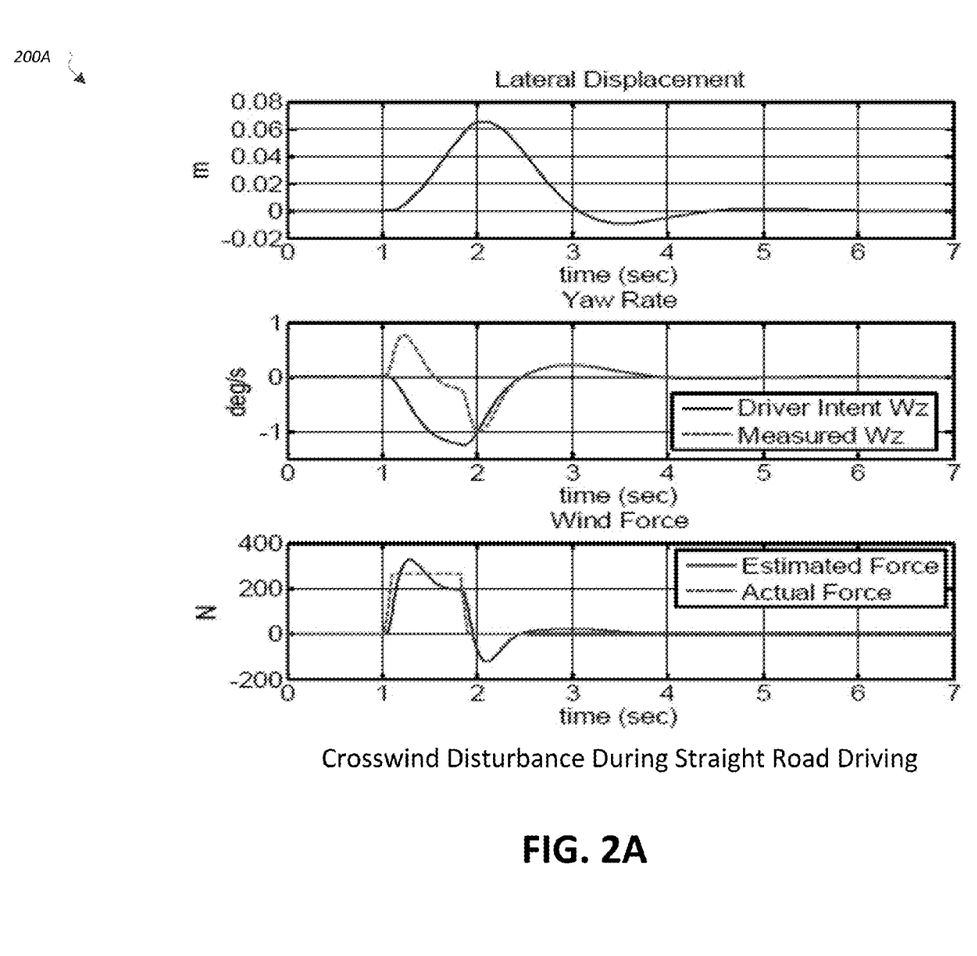
FIG. 2A illustrates an exemplary estimation of crosswind with respect to a vehicle headed in a straight direction of travel.
Figure 2B:
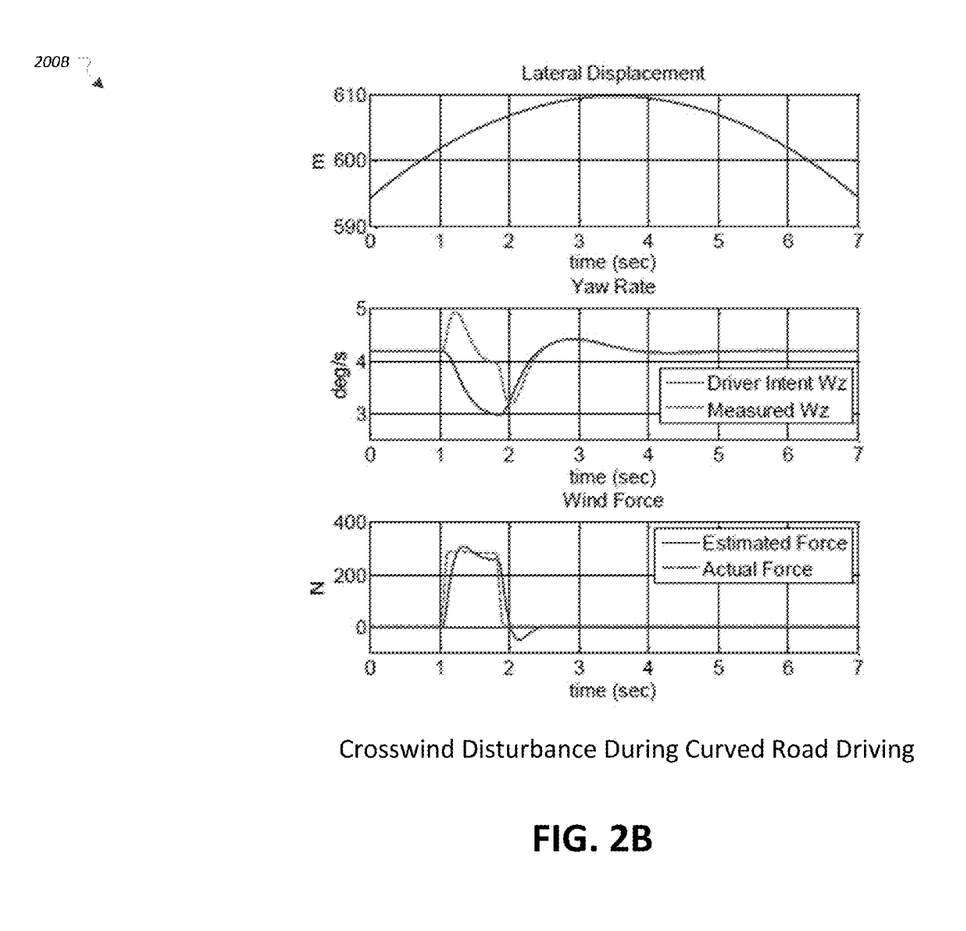
FIG. 2B illustrates an exemplary estimation of crosswind with respect to a vehicle headed along a curved road.
Figure 2C:
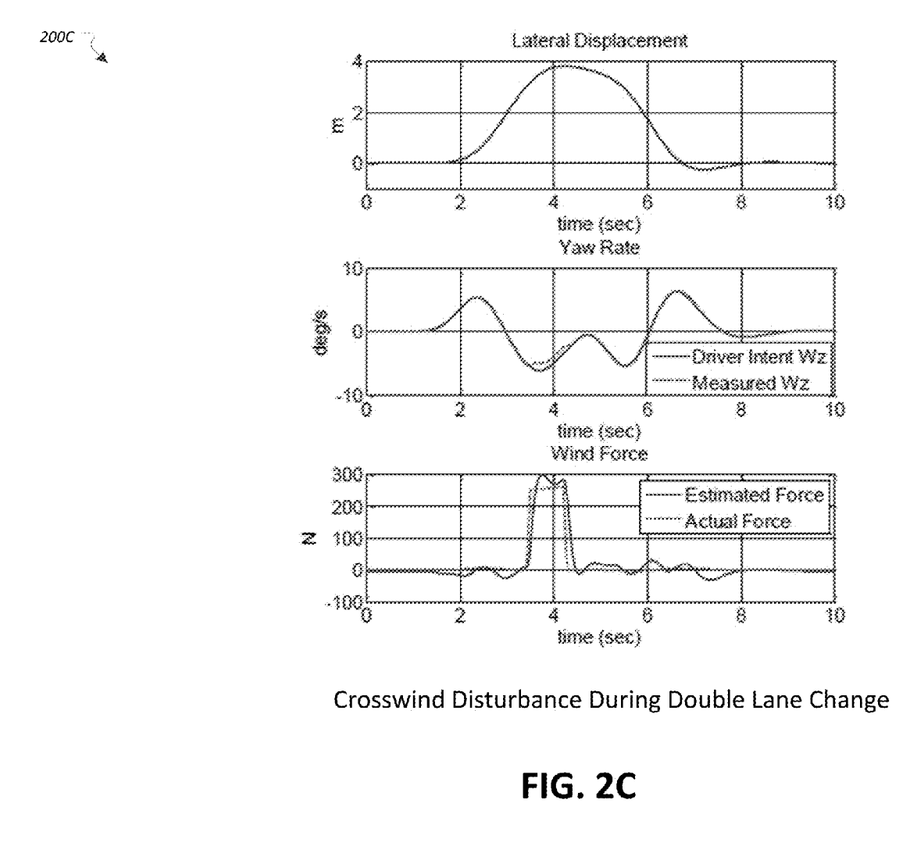
FIG. 2C illustrates an exemplary estimation of crosswind with respect to a vehicle performing a double lane change maneuver.

FIGS. 2A-2C each illustrates an exemplary scenario 200A-C including an estimation of crosswind 112 in different vehicle conditions. These scenarios 200A-C illustrate examples of the additional accuracy in crosswind estimation gained through use of the enhanced RLS method with multiple forgetting factors.

FIG. 2A illustrates an exemplary scenario 200A including an estimation of crosswind 112 with respect to a vehicle system 100 headed in a straight direction of travel. The exemplary scenario 200A includes a 40 km/h crosswind interaction with the vehicle system 100 traveling at 80 km/h down a road. As shown in the scenario 200A, the lateral displacement of the vehicle system 100 over time proceeds in one direction, back in the other direction past the original displacement, and then returns to the original course with further correction. The scenario 200A further illustrates yaw rate over the same period of time, including both measured yaw rate and driver intent yaw rate. The yaw rate or yaw velocity of a vehicle system 100 may measure angular velocity of rotation of the vehicle system 100 movement around the yaw axis, i.e., changes in direction of the vehicle system 100, and may commonly be measured in degrees per second or radians per second. The measured yaw rate may include data received from a yaw rate sensor of the vehicle system 100, while the driver intent yaw rate may include data received from a steering sensor of the vehicle system 100. The scenario 200A further illustrates effectively estimated crosswind 112 over the period of time using the enhanced RLS method with multiple forgetting factors, as can be seen according to the plotted and actual crosswind force.

FIG. 2B illustrates an exemplary scenario 200B including an estimation of crosswind 112 with respect to a vehicle system 100 headed along a curved road. In the scenario 200B, the lateral displacement of the vehicle system 100 is indicative of the lateral travel along a curved road. Further, the driver intent yaw rate illustrates driver intent to generally continue along the curved path, further including a driver adjustment between seconds one and two of the example. The scenario 200B further illustrates estimated crosswind 112 and actual crosswind force over the same period of time using the enhanced RLS method with multiple forgetting factors. As shown in the scenario 200B, the enhanced RLS method effectively separates the motion due to vehicle maneuvers from the crosswind disturbance.

FIG. 2C illustrates an exemplary scenario 200C including an exemplary estimation of crosswind 112 with respect to a vehicle system 100 performing a double lane change maneuver. As with the scenarios 200A and 200B, the exemplary scenario 200C illustrates the estimated crosswind 112 determined according to measured yaw rate and driver intent yaw rate, with good separation of crosswind estimation 112 from vehicle uncertainty 110.

Figure 3:
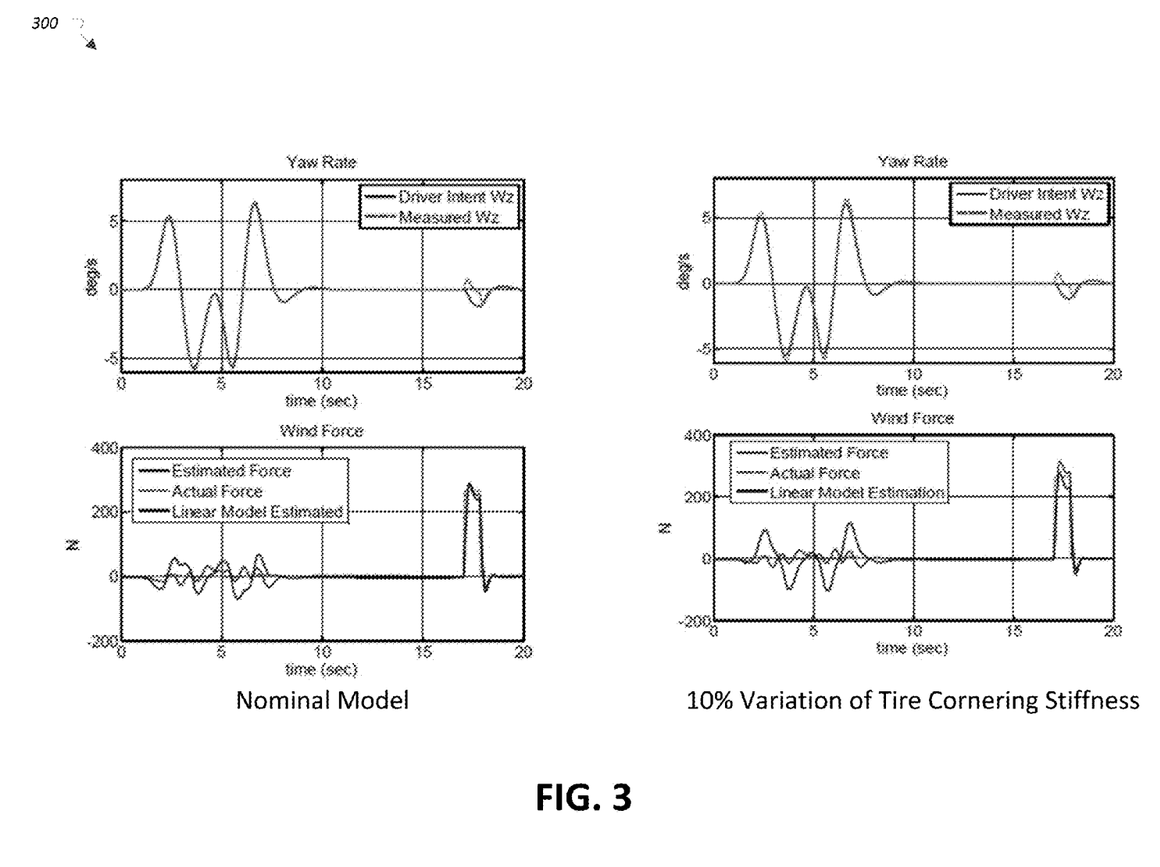
FIG. 3 illustrates an exemplary comparison of a linear model implementation of crosswind estimation with a multiple-forgetting factor implementation of crosswind estimation.

FIG. 3 illustrates an exemplary comparison 300 of a linear model implementation of crosswind estimation 112 with a multiple-forgetting factor implementation of crosswind estimation 112, such as provided by way of the crosswind and vehicle uncertainty estimator 108. The comparison 300 illustrates two scenarios, a nominal model, and also an estimation having a 10% variation in tire stiffness. As shown in the comparison 300, the linear model estimation suffers due to vehicle uncertainty 110 contamination of the crosswind estimation 112. This contamination is especially evident in the 10% variation in tire stiffness scenario, in which the linear model implementation includes substantially more driver intention 104 component as compared to the estimated crosswind 112 force. As compared to the linear model estimation, the enhanced RLS method more effectively separates the motion due to vehicle maneuvers from the crosswind disturbance.

Figure 4:
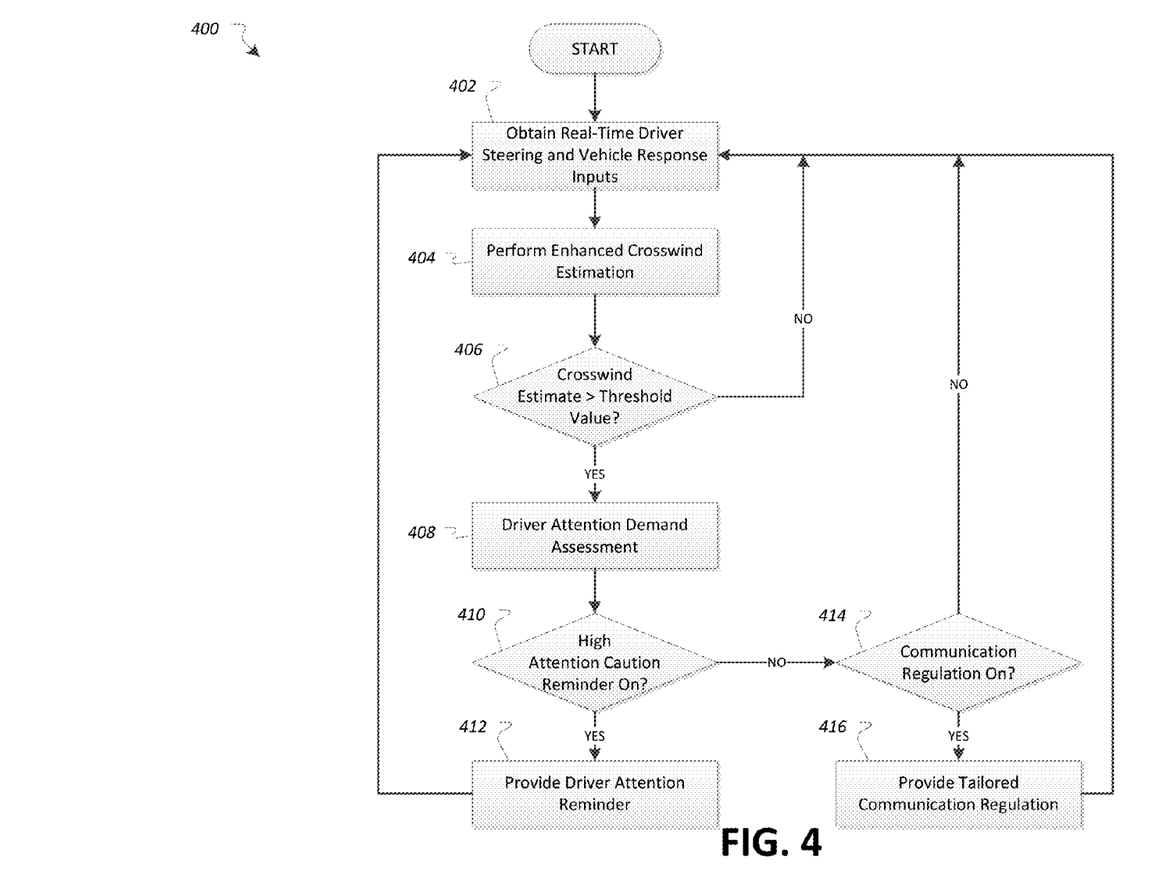
FIG. 4 illustrates an exemplary process for utilizing crosswind estimation to elevate driver attention and avoid overloading the driver with in-cabin communications.

FIG. 4 illustrates an exemplary process for utilizing crosswind estimation to elevate driver attention and avoid overloading the driver with in-cabin communications. The process 400 may be performed, for example, by a vehicle system 100 (FIG. 1) including a crosswind and vehicle uncertainty estimator 108. By use of the multiple-forgetting factor RLS estimation approach to improve the crosswind estimation 112, the vehicle system 100 may accordingly determine an enhanced estimation of driver driving-attention demand. Upon the detection of potential crosswind condition by the crosswind and vehicle uncertainty estimator 108, driver vehicle communication may be modulated to reduce possible driver inattentiveness and/or a warning signal may be issued by the vehicle system 100 to elevate driver focus.

More specifically, in block 402, the vehicle system 100 obtains real-time driver steering and vehicle response inputs. For example, the vehicle system 100 may receive driver steering inputs 102 indicative of driver intention from a steering sensor, and may receive crosswind disturbance inputs 106 indicative of a potential crosswind condition from a yaw rate sensor.

In block 404, the vehicle system 100 performs enhanced crosswind estimation. For example, the crosswind and vehicle uncertainty estimator 108 may receive the updated driver steering inputs 102 and crosswind disturbance inputs 106, and may utilize them as the most recent set of data for the RLS crosswind estimation as discussed in detail above. Based on the RLS crosswind estimation, the crosswind and vehicle uncertainty estimator 108 may accordingly determine an estimate of vehicle uncertainty 110, as well as improved crosswind estimation 112.

In decision point 406, the vehicle system 100 determines whether the crosswind estimate 112 exceeds a predetermined threshold value. For example, the predetermined threshold value may be set to a level indicative of a crosswind sufficient to warrant vehicle system 100 action or intervention to ensure driver attention or to avoid driver distraction. If the crosswind estimate 112 exceeds the predetermined threshold value, control passes to block 408. Otherwise control passes to block 402 to continue to monitor and provide crosswind estimates 112.

In block 408, the vehicle system 100 performs a driver attention assessment. The driver attention assessment may include an analysis of visual, physical and cognitive demand that secondary activities, such as infotainment, phone or telematics usage or pro-active recommendations, place on the driver above and beyond the primary activity of driving. One aspect that may be included in the analysis is crosswind estimation 112, as correction for crosswind conditions may be complicated for drivers and may require the driver to provide more of their attention to the primary task of driving and less to the other secondary tasks. Other aspects that may be considered in the driver attention assessment may include vehicle information (e.g. variations in speed, acceleration, braking, steering, headway, instrument panel interaction as determined from the vehicle system 100 controller area network (CAN)) and/or environmental information available (e.g., wet or icy road conditions determined through the detection of wheel slip) as some examples.

In decision point 410, the vehicle system 100 determines whether a high attention caution reminder should be performed to elevate driver focus. For instance, based on the driver attention assessment, the vehicle system 100 may identify whether environmental factors such as the crosswind estimation 112 and other vehicle information meet threshold criteria indicative of a high caution situation. As one example, a crosswind estimation 112 of a substantial crosswind may be sufficient to cause a reminder to be provided. As another example, the threshold criteria indicative of a high caution situation may include a crosswind estimation 112 in combination with other factors, such as vehicle speed or icy/wet road conditions. If the high attention caution reminder should be performed, control passes to block 412. Otherwise, control passes to decision point 414.

In block 412, the vehicle system 100 provides the driver attention reminder. The driver caution reminder may be provided to the driver in the driver interface 118 by driver communications 116 including one or more of: visual feedback (e.g., as a flashing light or array of lights, as an indication on the dashboard or telematics unit), audio feedback (as a buzzer, beep, chime or voice output), haptic feedback (e.g., by way of a vibrating steering wheel or seat), and provisioning of a telematic communication message to an external network (e.g., relaying information regarding time and location of experienced estimated crosswind to a networked system to cause the networked system to alert vehicle drivers within the vicinity of the experienced estimated crosswind of a potential crosswind condition). After block 412, control passes to block 402 to continue to monitor the crosswind situation.

In decision point 414, the vehicle system 100 determines whether communication regulation should be activated. For instance, the vehicle system 100 may identify whether environmental factors such as the crosswind estimation 112 and other vehicle information meet threshold criteria sufficient to cause the vehicle system 100 to regulate certain secondary vehicle functions to reduce driver distraction from the primary driving task, despite not meeting threshold criteria severe enough to require a caution reminder. As one example, a crosswind estimation 112 of a relatively minor crosswind may be sufficient to cause the vehicle system 100 to regulate certain secondary vehicle functions to reduce driver distraction. As another example, the threshold criteria to regulate certain secondary vehicle functions may include a crosswind estimation 112 in combination with other factors, such as vehicle speed or icy/wet road conditions. If the secondary vehicle function regulation should be performed, control passes to block 416. Otherwise, control passes to block 402 to continue to monitor the crosswind situation.

In block 416, the vehicle system 100 performs secondary vehicle function regulation to provide tailored communication to the driver. For example, the vehicle system 100 may delay display of pending messages 114 in the driver interface 118 until the conditions subside, or may prevent use of secondary vehicle features in the driver interface 118 such as phone or navigation until the crosswind conditions subside. After block 412, control passes to block 402 to continue to monitor the crosswind situation.

Thus, the vehicle system 100 may utilize a crosswind and vehicle uncertainty estimator 108 to determine an improved crosswind estimation 112 and estimate of vehicle uncertainty 110. Based on the improved crosswind estimation 112 addressing the vehicle uncertainty 110, during identified crosswind occurrences the vehicle system 100 may be configured to address a determined crosswind condition by regulating secondary vehicle functions to avoid driver distraction or by provisioning a driver caution reminder in the driver interface 118. As yet a further example, based on the crosswind estimation 112, the vehicle system 100 may be configured to automatically send communication about the location and time of experienced crosswind to networked mobile systems or a central receiver. For instance, a telematics unit of the vehicle system 100 may utilize a cellular data connection of the vehicle to provide crosswind information to a weather authority or other service upon detection of such conditions. Such information may be relayed to vehicle systems 110 in the vicinity of or headed toward the location of detected crosswind conditions by the weather authority or other service, and may be provided as messages 114 in the driver interface 118 of the recipient to inform the recipient vehicle systems 100 of possible crosswind conditions ahead.

In general, computing systems and/or devices such as the crosswind and vehicle uncertainty estimator 108 may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance.

Computing devices such as the crosswind and vehicle uncertainty estimator 108 generally include computer-executable instructions that may be executable by one or more processors. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor or microprocessor receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computing device). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein. Software to implement some or all of the functionality of the crosswind and vehicle uncertainty estimator 108 may be one such computer program product. In some example, the crosswind and vehicle uncertainty estimator 108 may be provided as software that when executed by the processor provides the operations described herein. Alternatively, the crosswind and vehicle uncertainty estimator 108 may be provided as hardware or firmware, or combinations of software, hardware and/or firmware.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method of crosswind estimation in a vehicle, comprising:
   identifying, via a vehicle processor, first and second forgetting factors accounting for rates of change of vehicle uncertainty and crosswind estimation, respectively; and
   utilizing a recursive-least-squares heuristic executed by a crosswind-and-vehicle-uncertainty estimator specialized with the forgetting factors to determine vehicle uncertainty and crosswind estimation from driver steering and crosswind disturbance inputs, the forgetting factors accounting for relatively slower-changing vehicle uncertainty and relatively faster-changing crosswinds.

2. The method of claim 1, further comprising:
   receiving updated driver steering inputs indicative of driver intention and updated crosswind disturbance inputs indicative of a potential crosswind condition; and
   applying the updated driver steering inputs and crosswind disturbance inputs to the recursive-least-squares heuristic according to the first and second forgetting factors.

3. The method of claim 1, further comprising at least one of receiving the driver steering inputs at least in part from a steering wheel sensor, and receiving the crosswind disturbance inputs at least in part from a vehicle yaw rate sensor.

4. The method of claim 1, further comprising:
   determining that the crosswind estimation exceeds a predetermined threshold; and
   determining whether to provide a caution reminder to the driver based at least in part on the crosswind estimation.

5. The method of claim 4, further comprising:
   identifying not to provide the caution reminder to the driver based at least in part on the crosswind estimation; and
   determining whether to tailor secondary driver task communications to the driver based at least in part on the crosswind estimation.

6. The method of claim 4, wherein the caution reminder includes at least one of audio feedback, visual feedback, haptic feedback, and provisioning of a telematic communication message to an external network.

7. The method of claim 1, further comprising automatically relaying information regarding time and location of experienced estimated crosswind to a networked system to cause the networked system to alert vehicle drivers within vicinity of the experienced estimated crosswind of a potential crosswind condition.

8. A computing device storing a crosswind and vehicle uncertainty estimator application, the crosswind and vehicle uncertainty estimator application being executable by a vehicle processor of the computing device to provide operations to determine crosswind estimation in a vehicle, the operations comprising:
   identifying first and second forgetting factors accounting for rates of change of vehicle uncertainty and crosswind estimation, respectively; and
   utilizing a recursive-least-squares heuristic specialized with the first and second forgetting factors to determine vehicle uncertainty and crosswind estimation from driver steering inputs and crosswind disturbance inputs, the first and second forgetting factors accounting for relatively slower-changing vehicle uncertainty and relatively faster-changing crosswinds.

9. The computing device of claim 8, further configured to provide operations comprising:
   receiving updated driver steering inputs indicative of driver intention and updated crosswind disturbance inputs indicative of a potential crosswind condition; and
   applying the updated driver steering inputs and crosswind disturbance inputs to the recursive-least-squares heuristic according to the first and second forgetting factors.

10. The computing device of claim 8, further configured to provide operations comprising at least one of receiving the driver steering inputs at least in part from a steering wheel sensor, and receiving the crosswind disturbance inputs at least in part from a vehicle yaw rate sensor.

11. The computing device of claim 8, further configured to provide operations comprising:
    determining that the crosswind estimation exceeds a predetermined threshold; and
    determining whether to provide a caution reminder to the driver based at least in part on the crosswind estimation.

12. The computing device of claim 11, further configured to provide operations comprising:
    identifying not to provide the caution reminder to the driver based at least in part on the crosswind estimation; and
    determining whether to tailor secondary driver task communications to the driver based at least in part on the crosswind estimation.

13. The computing device of claim 11, the caution reminder including at least one of audio feedback, visual feedback, haptic feedback, and provisioning of a telematic communication message to an external network.

14. The computing device of claim 8, further configured to provide operations comprising automatically relaying information regarding time and location of experienced estimated crosswind to a networked system to cause the networked system to alert vehicle drivers within vicinity of the experienced estimated crosswind of a potential crosswind condition.

15. A non-transitory computer readable medium storing a crosswind and vehicle uncertainty estimator application software program, the crosswind and vehicle uncertainty estimator application being executable by a vehicle processor to provide operations to determine crosswind estimation of a vehicle, the operations comprising:
    identifying first and second forgetting factors accounting for rates of change of vehicle uncertainty and crosswind estimation, respectively; and
    utilizing a recursive-least-squares heuristic specialized with the first and second forgetting factors to determine vehicle uncertainty and crosswind estimation from driver steering inputs and crosswind disturbance inputs, the first and second forgetting factors accounting for relatively slower-changing vehicle uncertainty and relatively faster-changing crosswinds.

16. The computer readable medium of claim 15, further executable to provide operations comprising:
    receiving updated driver steering inputs indicative of driver intention and updated crosswind disturbance inputs indicative of a potential crosswind condition; and
    applying the updated driver steering inputs and crosswind disturbance inputs to the recursive-least-squares heuristic according to the first and second forgetting factors.

17. The computer readable medium of claim 15, further executable to provide operations comprising at least one of receiving the driver steering inputs at least in part from a steering wheel sensor, and receiving the crosswind disturbance inputs at least in part from a vehicle yaw rate sensor.

18. The computer readable medium of claim 15, further executable to provide operations comprising:
  determining that the crosswind estimation exceeds a predetermined threshold; and
  determining whether to provide a caution reminder to the driver based at least in part on the crosswind estimation.

19. The computer readable medium of claim 18, further executable to provide operations comprising:
  identifying not to provide the caution reminder to the driver based at least in part on the crosswind estimation; and
  determining whether to tailor secondary driver task communications to the driver based at least in part on the crosswind estimation.

20. The computer readable medium of claim 18, the caution reminder including at least one of audio feedback, visual feedback, haptic feedback, and provisioning of a telematic communication message to an external network.

21. The computer readable medium of claim 15, further executable to provide operations comprising automatically relaying information regarding time and location of experienced estimated crosswind to a networked system to cause the networked system to alert vehicle drivers within vicinity of the experienced estimated crosswind of a potential crosswind condition.

* * * * *